United States Patent Office 3,549,752
Patented Dec. 22, 1970

3,549,752
STABLE SOLUTIONS OF THERAPEUTICALLY ACTIVE STEROID ENOL ETHERS AND PROCESS
Alberto Ercoli, Milan, and Rinaldo Gardi, Carate Brianza, Italy, assignors to Warner-Lambert Pharmaceutical Company, Morris Plains, N.J., a corporation of Delaware
No Drawing. Filed Dec. 26, 1967, Ser. No. 693,137
Claims priority, application Italy, Dec. 23, 1966, 31,494/66
Int. Cl. A61k *17/06*
U.S. Cl. 424—239    5 Claims

ABSTRACT OF THE DISCLOSURE

Stable oily solutions of therapeutically active 3-enol ethers of $\Delta^4$-3-ketosteroids are obtained by the addition of from 0.01 to 0.5% by volume of a nontoxic organic base having a $pK_b$ lower than 6. Suitable organic bases include morpholine, ethanolamine, triethanolamine, piperazine, ethylenediamine, n-butylamine, triethylamine, diethylamine, piperidine and pyrrolidine. Oily solutions of these enol ethers are stabilized against hydrolytic and oxidative degradation. The process is particularly suitable for stabilizing a sesame oil solution of quingestanol acetate (either alone or in combination with an estrogen) with piperidine.

---

This invention relates to a process for the stabilization of enol ethers of $\Delta^4$-3-ketosteroids in oily solutions and to the stabilized oily solutions obtained thereby.

It is known that the steroid enol ethers have recently achieved particular importance in view of their high oral activity. Some of them, particularly the cyclopentyl enol ethers of those $\Delta^4$-3-ketosteroids having anabolic, androgenic or progestative action, have been proposed, in lieu of the parent hormones, for being included in pharmaceutical preparations administrable by oral route.

However, the practical usefulness of the enol ethers is limited because of their easy degradation. Actually, by action of the light, air humidity and atmospheric oxygen the enol ethers hydrolyse giving the parent ketones and/or undergo an oxidative process leading to biologically inactive $6\beta$-hydroxy-$\Delta^4$-3-ketones.

Various expedients have been proposed to eliminate or at least to reduce the degradation process. For instance, quingestrone (3-cyclopentyl enol ether of progesterone) may be stabilized by suitable crystallisations in the presence of pyridine and $\alpha$-tocopherol, as recommended in U.S. patent Ser. No. 3,179,675, in order to make it possible to store this enol ether for extended periods.

It has also been suggested to dissolve the therapeutically active enol ethers in vegetable oils in order to preserve them from degradation. This expedient proved to be particularly useful since comparison tests (European J. of Steroids, 1966, 1, 29) evidenced that the absorption and hence the oral effectiveness of the enol ethers is improved when they are administered in oily solution rather than in tablets or aqueous suspension.

However the oily solutions solve the problem of the stability of the enol ethers only partially. In fact, while the hydrolytic process does not occur or occurs only in a quite negligible degree, the oxidative degradation of the enol ethers dissolved in oils does not stop and can reach a considerable value after some time. It has been ascertained that the formation of $6\beta$-hydroxy derivatives cannot be avoided neither by employing oils free from peroxides, nor by adding antioxidants such as $\alpha$-tocopherol or butyl-hydroxy-anisole to the oily solutions. Therefore, the increase of the amount of the inactive $6\beta$-hydroxy derivative which forms by autoxidation process causes a concurrent decrease of the therapeutic activity of the preparation.

It has now been found that oily solutions of therapeutically active 3-enol ethers of $\Delta^4$-3-ketosteroids can be stabilized by addition of a small amount of an organic base having a $pK_b$ lower than 6.

This invention thus provides stable oily solutions of therapeutically active enol ethers of $\Delta^4$-3-ketosteroids containing a small amount of an organic base having a $pK_b$ lower than 6 as a stabilizing agent.

Suitable organic bases are the non-toxic morpholine, ethanolamine, triethanolamine, piperazine, ethylenediamine, n-butylamine, triethylamine, diethylamine, piperidine, and pyrrolidine, among which piperidine, which has a $pK_b=2.8$, is preferred.

The enol ethers which are stabilized by the method of this invention are those of hormonally active $\Delta^4$-3-ketosteroids, particularly the therapeutically active enol ethers which have been disclosed in the U.S. patents Ser. No. 3,009,858; No. 3,115,440; No. 3,121,042; No. 3,240,671; No. 3,342,682 and in British Pat. No. 974,719. These compounds are: enol ethers of $\Delta^4$-3-ketosteroids having the cortisone side chain at $C_{17}$ and 21-esters thereof, alkyl and cycloalkyl enol ethers of 19-nor-testosterone, of $17\alpha$-lower alkyl and $17\alpha$-alkynyl-10-nortestosterone, such as $17\alpha$-ethynyl-19-nortestosterone, and 17-esters thereof, alkyl and cycloalkyl enol ethers of $17\alpha$-methyltestosterone and alkyl and cycloalkyl enol ethers of progesterone, $17\alpha$-acetoxyprogesterone and 19-nor-derivatives thereof.

The oily vehicles are those from animal or vegetable sources already proposed for making oily solutions of enol ethers, such as corn oil, lard oil, olive oil, linseed oil, sunflowerseed oil, palm oil, peanut oil, sesame oil, soya bean oil, wheat germ oil and the like. Preferred vegetable oil is semane oil, but other volvents, such as synthetic mono-, di- or tri-glycerides or also esters of aliphatic carboxylic acids with 10–22 carbon atoms can be used. Solubilizing agents, such as benzyl benzoate or cholesterol esters can be also added, when necessary.

According to the method of this invention, the organic base having a $pK_b$ lower than 6 is added to the oily solutions of enol ethers in an amount of from about 0.01 to about 0.5% by volume and preferably from 0.025 to 0.1% by volume. It is so possible to obtain a very stable solution, wherein the oxidative degradation of the enol ether and the consequent loss of activity of the product does not occur or occurs in a negligible degree. It has been ascertained that the solutions so stabilized can be stored for extended periods without appreciable loss of activity. The enol ethers contained therein do not degradate even when the solutions are kept at high temperatures up to 60° C. for a period of 10–15 days. Therefore, the solutions so stabilized can be worked to manufacture pharmaceutical preparations without taking particular precautions.

The process of the present invention is particularly suitable for stabilizing oily solutions of quingestanol acetate (3 - cyclopentyloxy-$17\alpha$-ethynyl-$17\beta$-acetoxy-19-nor-$\Delta^{3,5}$-androstadiene) having the structural formula:

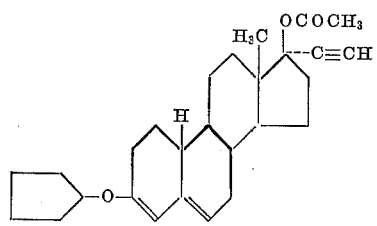

Quingestanol acetate is an orally active synthetic sex-hormone which possesses a remarkable progestative activity and is preferably administered, either alone or in combination with other hormones, in capsules containing a lipidic oily vehicle.

According to a preferred feature of the present invention, quingestanol acetate, either alone or in association with an estrogen, preferably ethynyl-estradiol or a 3-lower alkyl or 3-cyclopentyl ether thereof, is dissolved in a vegetable oil, preferably sesame oil, in an amount of from 0.02 to 10 g./l. To the solution so obtained the organic base, preferably piperidine, is added in such an amount that the solution contains from 0.01 to 0.5% and preferably from 0.025 to 0.1% by volume of the organic base.

The solutions so stabilized can be poured into capsules thus providing stable pharmaceutical compositions for oral use containing from 0.02 to 10 mg. of quingestanol acetate per dosage unit.

In order further to illustrate this invention the following examples are given.

EXAMPLE 1

To a solution of 50 g. of quingestanol acetate in 12 l. of sesame oil was added 6.2 ml. of piperidine. By additional sesame oil the total volume of the solution was made up to 12.4 liters and the limpid and homogeneous solution was poured into 0.124 ml. gelatine capsules. 100,000 capsules were so obtained each containing 0.5 mg. of quingestanol acetate and 0.000062 ml. of piperidine. During the working, $6\beta$-hydroxy-$\Delta^4$-3-keto-derivative formed in the percentage from 0.1 to 0.2%, but after 8 months storage the percentage of the $6\beta$-hydroxy-derivative remained unchanged.

EXAMPLE 2

To a solution of 50 g. of quingestanol acetate in 15 l. of sesame oil was added 7.7 ml. of piperidine. By additional sesame oil the volume of the solution was made up to 15.4 liters. The limpid and homogeneous solution was poured into 0.308 ml. gelatin capsules so that 50,000 capsules were prepared each containing 1 mg. of quingestanol acetate and 0.000154 ml. of piperidine. The capsules were stored for a year without any degradation of the active product.

An analogous preparation containing 0.1% of $\alpha$-tocopherol instead of piperidine, after a year storage contained 4% of $6\beta$-hydroxy-$17\alpha$-ethynyl-19-nor-testosterone acetate.

EXAMPLE 3

To a solution of 20 g. of quingestanol acetate in 12 l. of sesame oil was added 6.2 ml. of piperidine. By additional sesame oil the volume of the solution was made up to 12.4 liters. The solution so obtained was poured into 0.124 ml. gelatin capsules so that 100,000 capsules were prepared each containing 0.2 mg. of quingestanol acetate and 0.000062 ml. of piperidine.

In the same manner, by using 10 g. of quingestanol acetate, 100,000 capsules (0.124 ml.) were prepared each containing 0.1 mg. of active product and 0.000062 ml. of piperidine.

EXAMPLE 4

To a solution of 25 g. of quingestanol acetate in 4.5 l. of sesame oil was added 2.46 ml. of piperidine. By additional sesame oil the volume of the solution was made up to 4.92 liters and the resulting solution was poured into 0.492 ml. gelatin capsules. 10,000 capsules were prepared each containing 2.5 mg. of quingestanol acetate and 0.000246 ml. of piperidine. In these capsules was present about 0.3% of $6\beta$-hydroxy-$17\alpha$-ethynyl-19-nor-testosterone acetate; after a 9 months storage the $6\beta$-hydroxy derivative was in the percentage of 0.5% only.

EXAMPLE 5

50 g. of quingestanol acetate and 2.5 g. of $17\alpha$-ethynyl estradiol were dissolved in 9 l. of sesame oil and to the limpid solution 4.6 ml. of piperidine was added. By additional sesame oil the solution was made up to 9.2 l.

Such solution was poured into 0.184 ml. gelatin capsules thus obtaining 50,000 capsules containing an association of quingestanol acetate (1 mg.) and ethynyl estradiol (0.05 mg.) with 0.000046 ml. of piperidine.

EXAMPLE 6

50 g. of quingestanol acetate and 5 g. of $17\alpha$-ethynyl estradiol were dissolved in 12 l. of sesame oil and to the solution so obtained was added 6.2 ml. of piperidine. By additional sesame oil the volume of the solution was made up to 12.4 liters. By pouring the limpid solution into 0.124 ml. capsules, 100,000 capsules were prepared, each containing 0.5 mg. of quingestanol acetate and 0.05 mg. of ethynyl estradiol. After a year at room temperature the capsules contained $6\beta$-hydroxy-$17\alpha$-ethynyl-19-nor-testosterone acetate in a percentage of 0.5% only.

EXAMPLE 7

125 g. of quingestrone (3-cyclopentyl enol ether of progesterone) was dissolved in 2.8 l. of sesame oil and to the solution so obtained 15.4 ml. of piperidine was added. By additional sesame oil the volume of the solution was made up of 3.08 liters. By pouring the limpid solution into 0.616 ml. gelatin capsules, 5,000 capsules were prepared, each containing 25 mg. of quingestrone.

In the same manner capsules each containing 25 mg. of 3-cyclopentyl enol ether of 19-nor-progesterone were prepared.

EXAMPLE 8

To a solution of 100 g. pentagestrone acetate (3-cyclopentyl enol ether of $17\alpha$-acetoxy-progesterone) in 4.5 l. of sesame oil was added 23.1 ml. of piperidine. By additional sesame oil the solution was made up to 4.62 liters. By pouring this solution into 0.462 ml. gelatin capsules, 10,000 capsules were prepared, each containing 10 mg. of pentagestrone acetate.

By dissolving the same amount of pentagestrone acetate in 3.08 l. of sesame oil in the presence of 15.4 ml. of piperidine, 5,000 capsules (0.616 ml.) were prepared each containing 20 mg. of active product.

EXAMPLE 9

To a solution of 100 g. of n-hexyl enol ether of $17\alpha$-methyl-testosterone in 3.5 l. of sesame oil was added 18.45 ml. of piperidine. By additional sesame oil the volume of the solution was made up to 3.69 liters. By pouring this solution into 0.369 ml. gelatin capsules, 10,000 capsules were prepared, each containing 10 mg. of n-hexyl enol ether of $17a$-methyltestosterone.

In an analogous manner, from a solution of 250 g. of the product and 23.1 ml. of piperidine in 4.62 l. of sesame oil, 10,000 capsules were prepared each containing 25 mg. of n-hexyl enol ether of $17\alpha$-methyltestosterone.

EXAMPLE 10

100 g. of 3-cyclopentyloxy-$17\alpha$-acetoxy-16-methylene-$\Delta^{3,5}$-pregnadien-20-one (3-cyclopentyl enol ether of 16-methylene $17\alpha$-acetoxy-progesterone) was dissolved in 9 l. of sesame oil and to the solution so obtained 4.92 ml. of piperidine was added. By additional sesame oil the solution was made up to 9.84 l. and the limpid solution thus obtained was poured into 0.492 ml. gelatin capsules. So, 20,000 capsules were prepared each containing 5 mg. of 3-cyclopentyl enol ether of 16-methylene-$17\alpha$-acetoxy-progesterone.

EXAMPLE 11

Stability test

A number of oily solutions of 5 mg./ml. quingestanol acetate, stabilized by addition of an organic base having a $pK_b$ lower than 6, in accordance with the method of the present invention, were compared with solutions containing the same amount of quingestanol acetate and of an organic base having a $pK_b$ higher than 6 and/or a known antioxidant. The samples were stored at 60° C. for a certain period then were analysed to determine the oxidation degree of the active substance. In Table 1 are given the amounts of 6β-hydroxy-17α-ethynyl-19-nor-testosterone acetate found in the samples on the eleventh day of the storage.

TABLE 1

| Additive | $pK_b$ | Percent | 6β-hydroxy-17α-ethynyl-19-nor-testosterone acetate, 11 day assay, percent |
|---|---|---|---|
| Piperidine | 2.8 | 0.05 | 1 |
| Ethylenediamine | 4 | 0.05 | 1 |
| Ethanolamine | 4.6 | 0.05 | 1 |
| Morpholine | 5.6 | 0.05 | 2 |
| Collidine | 6.7 | 0.05 | 7 |
| Aniline | 9.4 | 0.05 | 7 |
| Pyridine plus α-tocopherol | 8.8 | 0.05+0.1 | 7 |
| α-tocopherol | | 0.1 | 7 |
| Butyl-hydroxy-anisole (BHA) | | 0.1 | 7 |

From Table 1 it becomes apparent that the presence of the common antioxidants or of organic bases having a $pK_b$ higher than 6 does not preserve quingestanol acetate from the oxidative degradation, so that on the eleventh day the amount of 6β-hydroxy-derivative reach the 7%, while in the samples stabilized in accordance with the method of the present invention the percentage of 6β-hydroxy-derivative is not higher than 2%.

We claim:
1. A stable oily solution of a therapeutically active but unstable and otherwise easily hydrolytically and/or oxidatively degradable oil soluble 3-enol ether of a Δ⁴-3-ketosteroid selected from the group consisting of:
 (1) enol ethers of Δ⁴-3-ketosteroids having the cortisone side chain at $C_{17}$ and 21-esters thereof;
 (2) alkyl and cycloalkyl enol ethers of 19-nortestosterone and 17-esters thereof;
 (3) alkyl and cycloalkyl enol ethers of 17α-lower alkyl-19-nor-testosterone and 17-esters thereof;
 (4) alkyl and cycloalkyl enol ethers of 17α-lower alkynyl-19-nor-testosterone and 17-esters thereof;
 (5) alkyl and cycloalkyl enol ethers of 17α-methyl-testosterone and 17-esters thereof;
 (6) enol ethers of progesterone and of 17α-hydroxy and acyloxy progesterone of the formula:

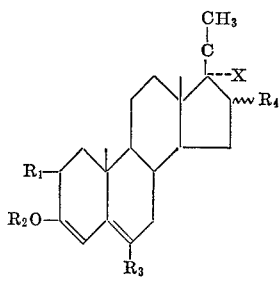

wherein $R_1$ is hydrogen or methyl; $R_2$ is alkyl or cycloalkyl; $R_3$ is hydrogen, chlorine, or methyl; $R_4$ is α-methyl, β-methyl or hydroxy; and X is hydrogen, hydroxy or acyloxy;
 (7) alkyl and cycloalkyl enol ethers of 17α-bromo-progesterone;
 (8) alkyl and cycloalkyl enol ethers of 6-methyl-17α-bromoprogesterone;
 (9) alkyl and cycloalkyl enol ethers of 19-nor-progesterone, 17α-hydroxy-19-norprogesterone, and 17α-acetoxy-19-norprogesterone; and
 (10) cyclopentyl enol ether of 16-methylene-17α-acetoxyprogesterone;

dissolved in an oil selected from the group consisting of corn oil, lard oil, olive oil, linseed oil, sunflowerseed oil, palm oil, peanut oil, sesame oil, soya bean oil, wheat germ oil, synthetic mono, di- or triglycerides and esters of aliphatic carboxylic acids with 10–22 carbon atoms containing from 0.01 to 0.5% by volume of piperidine as the essential stabilizing agent effective to stabilize the enol ethers against hydrolytic and oxidative degradation.

2. A stable oily solution of an effective oral dosage unit of therapeutically active but unstable and otherwise easily hydrolytically and/or oxidatively degradable oil soluble quingestanol acetate having the formula:

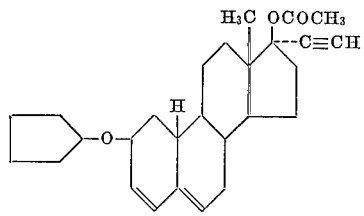

dissolved at a concentration of 0.02 to 10 g. per l. in an oil selected from the group consiting of corn oil, lard oil, olive oil, linseed oil, sunflowerseed oil, palm oil, peanut oil, sesame oil, soya bean oil, wheat germ oil, synthetic mono, di- or tri-glycerides and esters of aliphatic carboxylic acids with 10–22 carbon atoms containing from 0.025 to 0.1% by volume of piperidine as the essential stabilizing agent effective to stabilize the quingestanol acetate against hydrolytic and oxidative degradation.

3. A stable oily solution according to claim 2 which contains also a 17α-ethynyl estradiol or a 3-lower alkyl or 3-cyclopentyl ether thereof.

4. A pharmaceutical capsule containing a stable oily solution comprising from 0.02 to 10 mg. of quingestanol acetate in sesame oil solution and pipeidine in an amount of from 0.025 to 0.1% by volume of said solution.

5. A stable oily solution of quingestanol acetate in accordance with claim 4 in combination with 0.05 mg. of ethynyl estradiol.

References Cited

UNITED STATES PATENTS

| 1,822,934 | 9/1931 | Murrill | 99—163X |
| 2,130,079 | 9/1938 | Evans | 260—611.5 |
| 2,377,030 | 5/1945 | Norris | 99—163X |
| 2,806,794 | 9/1957 | Hodge et al. | 99—163 |
| 3,009,858 | 11/1961 | Ercoli | 424—37 |
| 3,115,440 | 12/1963 | Ercoli | 424—238 |
| 3,121,042 | 2/1964 | Ercoli | 424—238X |
| 3,159,543 | 12/1964 | Ercoli | 424—239 |
| 3,179,675 | 4/1965 | McMillan et al. | 260—397.4 |
| 3,240,671 | 3/1966 | Ercoli | 424—238 |
| 3,342,682 | 9/1967 | Ercoli | 424—238 |
| 3,417,183 | 12/1968 | Ercoli et al. | 424—239X |

FOREIGN PATENTS 974,719  11/1964  Great Britain.

OTHER REFERENCES

Tetrahedron 6(4): 291 June 1959.

SHEP K. ROSE, Primary Examiner

U.S. Cl. X.R.

424—243

UNITED STATES PATENT OFFICE
CERTIFICATE OF CORRECTION

Patent No. 3,549,752                     Dated December 22, 1970

Inventor(s) Alberto Ercoli and Rinaldo Gardi

It is certified that error appears in the above-identified patent and that said Letters Patent are hereby corrected as shown below:

Column 2, line 35 "volvents" should read --solvents--.

Column 5, Claim 1, in the formula an oxygen atom should be inserted in position 20 as follows:

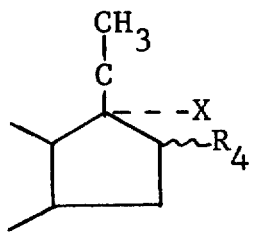          should be          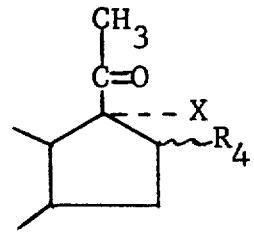

Column 6, Claim 2, the formula should be amended as follows

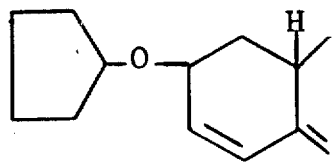          should be          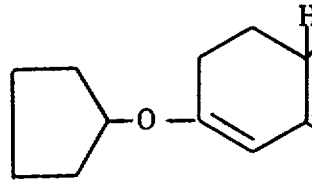

Column 6, Claim 4, line 3, "pipeidine" should read --piperi

Signed and sealed this 29th day of June 1971.

(SEAL)
Attest:

EDWARD M. FLETCHER, JR.                    WILLIAM E. SCHUYLER, JR.
Attesting Officer                          Commissioner of Patents